Jan. 8, 1952 M. KADENACY 2,581,668
TURBO-SUPERCHARGED INTERNAL-COMBUSTION ENGINE
HAVING IMPLOSIVE INLET AND EXPLOSIVE EXHAUST
Filed April 13, 1945 5 Sheets-Sheet 3

INVENTOR
Michel Kadenacy
BY
Pennie Davis Marvin Edmonds
ATTORNEYS

Patented Jan. 8, 1952

2,581,668

UNITED STATES PATENT OFFICE 2,581,668

TURBO-SUPERCHARGED INTERNAL-COMBUSTION ENGINE HAVING IMPLOSIVE INLET AND EXPLOSIVE EXHAUST

Michel Kadenacy, Summit, N. J.; Nina K. Guercken executrix of said Michel Kadenacy, deceased Application April 13, 1945, Serial No. 588,188

2 Claims. (Cl. 60—13)

This invention relates to power generating apparatus which includes an internal combustion engine and means for utilizing the energy possessed by the exhaust gases discharged therefrom. More specifically, the invention resides in a novel power plant of the type referred to, which includes an internal combustion engine of the two stroke cycle type and is superior to prior similar equipment in that the exhaust gases are more effectively used and their use does not adversely affect the operation of the engine. The new plant, accordingly, operates with greater overall efficiency than prior similar plants.

In the operation of the power plant of the invention in its preferred form, the functioning of the engine is based on the phenomena of explosive exhaust and implosive inlet, and, as a result, the cylinder of the engine is self-cleaning and it is not necessary to provide a blower or other means for compressing air for scavenging and charging purposes. The exhaust gases from the engine are stored under pressure and utilized for driving a turbine or similar apparatus, which may be connected to drive a dynamo or other suitable machine. By proper construction and operation of the inlet and exhaust means of the engine and by proper construction of the means connecting the engine to the turbine, the stored exhaust gases are prevented from interfering with the operation of the engine and the engine, accordingly, performs its functions to the best advantage and without reduction in efficiency resulting from the recovery of energy from the exhaust gases.

It is well known that two stroke cycle internal combustion engines of the old type, that is, engines which do not utilize explosive exhaust and implosive inlet, cannot be started or operated without the use of a blower or other means for supplying compressed air to the cylinder. In such an engine, at the moment when the inlet port of the cylinder is opened, the cylinder is filled with burned gases under pressure, so that the incoming fresh air must be supplied under sufficient pressure to overcome the pressure and resistance of the burned gases and push those gases out of the cylinder. The use of inlet air under pressure for scavenging the cylinder results in a mixing of the fresh air and burned gases, so that the new charge is fouled to some extent and its value as a source of energy is correspondingly impaired. Also, the pressure of the new charge within the cylinder is normally below that of the inlet air at the source of supply thereof. The use of the blower for supplying the engine with fresh air under pressure necessarily reduces the output of the installation by the amount of power consumed by the blower.

In power plants heretofore known, in which a turbine or turbo-blower system is operated by the exhaust gases from an engine not utilizing explosive exhaust and implosive inlet, it is again necessary to supply the inlet air to the cylinder under pressure and the pressure of the inlet air at the source must be greater than that required in similar installations, which do not include a turbine or turbo-blower. One reason for this is that the connection of a turbine to the exhaust system of an engine necessarily results in an increase of pressure in the exhaust gas conduit ahead of the turbine because of the resistance of the turbine to flow of the exhaust gases therethrough. The back pressure in the exhaust conduit results in an increase in pressure of the residual burned gases in the cylinder, and, hence, requires that the pressure of the inlet air be correspondingly increased. In such an installation, a turbo-blower driven by the exhaust gases from the engine cannot be used as the sole source of compressed inlet air without a reduction in the net output of the engine. The reason is that the turbo-blower cannot supply the necessary quantity of air to the engine at a pressure sufficient to overcome both the resistance offered by the residual burned gases under pressure within the cylinder at the time of inlet and also the dynamic reaction of exhaust gases rebounding through the exhaust conduit and opposing the admission of a fresh charge into the cylinder. Accordingly, if the turbo-blower driven by exhaust gases is used as the only source of inlet air under pressure, the net output of the engine decreases because of insufficient charge, and it is the practice to supplement the air under pressure produced by the turbo-blower with compressed air from another source.

All the foregoing difficulties and disadvantages inherent in prior installations are overcome or avoided in the power plant of the invention, in which a two cycle internal combustion engine is employed and the engine is operated to utilize the phenomena of explosive exhaust and implosive inlet, the use of such phenomena being fully explained in my co-pending application, Serial No. 588,189, entitled "Power Plant" and filed on the same date as this application. Reference may also be had to my prior U. S. Patents Nos. 2,102,559; 2,123,569; 2,130,721; 2,131,959; 2,144,065 and others for further explanation of such phenomena and the utilization thereof.

In the engine of the installation of the invention, the explosion of the burned gases out of the cylinder during the exhaust process cleans the cylinder of those gases, and the implosive inlet, which follows, fills the cylinder with a fresh and pure charge of inlet air or other gaseous medium. The implosion of the fresh gases also causes some of those gases to pass through the cylinder and, upon closure of the exhaust orifice, the momentum of the mass of the imploded fresh gases supercharges the cylinder, i. e., builds up a pressure inside the cylinder greater than the pressure at the source of supply of inlet gas. The self-cleaning of the burned gases from the cylinder by explosive exhaust, the implosive inlet of the fresh gases, and the supercharging can all be performed with the inlet gas supply at atmospheric pressure and without the use of a blower, either for starting or continuous operation.

The inlet gases may, if desired, be supplied to the engine of the power plant of the invention at a pressure above atmospheric from a suitable source, such as a blower or compressor, but the implosive inlet and explosive exhaust processes are not disturbed by the increased pressure. Such an increase in pressure at the source of supply intensifies and increases the positive results and advantages of those processes in the functioning of the engine and does not reduce its net output.

When the engine is operated as above described, the imploded fresh gases do not have to overcome the resistance of any residual burned gases within the cylinder or push the burned gases out of the cylinder, as is necessary during the scavenging and charging process in older types of two cycle engines. The reason for this is that the inlet port is opened to permit implosive inlet to manifest itself when the exhaust gases have been accelerated and are in movement as a mass out of and away from the cylinder, the inertia of such mass being sufficient to carry the burned gases out of the cylinder without assistance from the incoming fresh gases or otherwise. The imploded mass of inlet gases enters the cylinder behind the burned gases, which move out of the cylinder ballistically in a mass and leave vacant the space previously occupied thereby. Since the incoming gases do not push out the burned gases, there can be no mixing of the fresh gases with the burned gases, until the latter rebound and produce a shock upon meeting the incoming gases. Such shock and any resulting reversal of movement of some of the incoming gases would occur in the exhaust gas conduit outside of and away from the cylinder, but the adverse consequences of such shock and reversal of movement, such as mixing of the fresh and burned gases within the cylinder, are prevented by the opportune closing of the exhaust port of the cylinder.

The engine of the new installation can be made to start and function satisfactorily with inlet air at atmospheric pressure, provided the explosive exhaust and implosive inlet processes are properly coordinated with respect to the initiation and duration thereof, such coordination being effected by proper construction and control of the inlet and exhaust ports of the cylinders. Proper timing of the operation of the mechanical control devices for the exhaust and inlet orifices to produce most advantageous explosive exhaust and implosive inlet is facilitated by proper construction of the exhaust gas conduit and other connecting means between the engine cylinders and a turbine, if the latter is installed for operation by the exhaust gases. Such an engine can produce a normal output of approximately 140 lbs. per square inch of B. M. E. P. without the use of a blower or other source of compressed air. When the inlet air for this same engine is under a pressure of 8 lbs. per square inch at its source of supply, the normal output can rise to 250 lbs. per square inch of B. M. E. P. without taking into account the available energy in the exhaust gases.

These results illustrate the superiority of the type of engine employed in the power plant of the present invention and are obtained partly because the incoming fresh gases or combustible charge do not encounter resistance offered by the burned gases within the engine cylinder. Accordingly, the ultimate pressure of the fresh charge is greater than in the prior engines and the charge is not fouled by burned gases.

As disclosed in my co-pending application and my prior patents, the explosive exhaust phenomenon includes two primary mass movements of the burned gases, which may also be called ballistic movements, since they take place at ballistic speed as a result of explosive acceleration. The first of these movements occurs when the exhaust orifice is suddenly opened and the exhaust gases virtually explode and thereby accelerate their own proper mass as well as the masses of inert gases which fill the space in the path of exhaust gas mass. When the mass of burned gases has gained a sufficiently high speed, it ceases to react against the wall of the engine cylinder and simultaneously starts to move out of and away from the cylinder as a mass by virtue of its inertia. The combined mass of exhaust gases and of the inert gases accelerated thereby will compress more and more of the inert gases lying in its path of movement and also incorporate such inert gases into the moving mass of gases. The dynamic energy of the mass of exhaust and the inert gases, which are accelerated by the explosion of the burned gases out of the cylinder, is expended in overcoming the resistance of the inert gases in its path of movement and in compressing and displacing these gases, until a gaseous pressure front is built up inside the mass of gas contained in the connecting means between the engine cylinder and the turbine. The first mass movement of the exhaust gas terminates when the dynamic energy thereof has been spent in accelerating, moving, and compressing inert gases to form the pressure front consisting of a mass of gases under high pressure.

The second of the two mass movements of the burned gases takes place in the direction of the engine cylinder, when the exhaust gases and some of the inert gases forming a part of the pressure front rebound therefrom and are projected toward the cylinder through the exhaust gas conduit. This rebounding or return movement of the exhaust and inert gas mass produces a shock upon meeting the oncoming fresh gases and ends when the dynamic energy of the return movement is absorbed by the imploded mass of inert gases or, if the exhaust orifice has been closed, by the gases which are trapped in the exhaust conduit. It will be understood that, during the time consumed by the first movement of the exhaust gas mass, after its acceleration, and the first portion of the second or return movement, some of the fresh gases introduced by implosion may have passed through the engine cylinder and the exhaust orifice into the exhaust gas conduit.

In my Patent No. 2,281,585, there is described a method and an inlet device, by the use of which intensified implosive inlet and an enhanced supercharging effect in the cylinders of two cycle internal combustion engines are obtained. The present invention contemplates the application of the patened method and inlet system to a two cycle engine combined with a turbo-blower or the like driven by the exhaust gas of the engine, the latter being adapted to function by explosive exhaust followed by implosive inlet, and the turbo-blower being suitably designed and installed to produce a high supercharging effect in the cylinder of the engine to thereby obtain a high output from the total power plant, consisting of the engine, turbine, and blower.

In order to produce most effective implosive inlet and charging of the cylinder of a two cycle engine, it is advantageous to have as long a time interval as is possible for that process. The interval, during which the phenomenon of implosive may manifest itself, begins at the instant when the mass of exhaust or burned gases has been accelerated by the exhaust explosion and has acquired a speed so great that the momentum thereof will project the mass out of and away from the cylinder. At this moment, the burned gas mass ceases to react against the walls of the cylinder and its movement is continued by virtue of its inertia. The outward movement of the explosively exhausted burned gas mass terminates with the formation of the static pressure front, from which a portion of the gases rebound back toward the engine cylinder. The interval for effecting implosive inlet terminates when these rebounding gases produce a shock against the contents of the engine cylinder, and, hence, stop the incoming movement of the inlet gases.

The length of travel of the exhaust gas mass away from the engine cylinder and, hence, the time consumed by the first movement of the mass will be determined by the amount of dynamic energy is the burned gases and the rate at which it is consumed by moving and compressing the inert gases lying in the path of the exhaust gas mass. In order to secure the longest path of travel and, hence, the most advantageous time interval for implosive inlet, the exhaust conduit should be constructed to provide a "free passage" for the exhaust gas mass, that is the exhaust gas conduit should contain the smallest possible mass of inert gases, per unit length consistent with the otherwise free movement of the explosively projected burned gas mass out of and away from the engine cylinder. On the other hand, the exhaust gas conduit must have a cross-sectional area approximately equal to the critical area of the exhaust port of the cylinder, that is, the area of the port opened, when the exhaust gases cease reacting upon the cylinder wall and start to leave the cylinder as a mass, and should not offer resistance to the passage of the mass of exhaust gases therethrough either as a result of friction or of deformation of the cross-section of the gaseous mass. For this reason, the longest path and, hence, the longest time interval for the outward travel for the exhaust gas mass, will be attained when the exhaust conduit has a cross-sectional area substantially equal to the critical area of the exhaust port and is of proper cross-sectional shape and internally smooth, and when the length of the conduit is such that the conduit contains such an amount of inert gas so that the dynamic energy of the explosively projected exhaust gases is utilized in accelerating, displacing, and compressing inert gas therein and is thus wholly transformed into energy contained in the gaseous pressure front. The conduit may be of increasing diameter from the exhaust orifice, as illustrated.

The volume of the exhaust gas conduit should be supplemented by an exhaust gas receiver or similar enclosed space ahead of the turbine wheel and the volume of the space should be large enough to contain the inert gases displaced by the moving exhaust gas mass and provide space for the formation of the gaseous pressure front, when the dynamic energy of the exploded exhaust gases is a maximum. If the exhaust gases and the inert gases accelerated thereby rebound from a wall of the container or conduit rather than from a gaseous pressure front, the return movement of the gases toward the cylinder will start sooner than would otherwise be the case. The greater the distance that the exhaust gases have to travel in their movements away from and back toward the engine cylinder, the greater will be the interval of time available for the performance of implosive inlet. This interval will be greatest, when the dynamic energy of the exhaust gas mass is properly and effectively utilized in accordance with the present invention.

The invention, accordingly, comprehends the provision of a power generating plant, wherein the dynamic energy of burned gases explosively exhausted from the cylinder of a two cycle internal combustion engine is utilized during acceleration of the gases to exercise a push against the inert gases under pressure in an exhaust gas conduit and to continue the pushing of the inert gases by virtue of the momentum acquired by the burned gases to thereby keep out of the engine cylinder, the active burned gas and the inert gases stored under pressure in the exhaust conduit and an enclosed space communicating therewith. Such utilization of the exhaust gases prevents them from exercising any adverse action on the contents of the cylinder during the time of the implosive inlet operation and during the time that the exhaust orifice is open. The dynamic energy of the burned gases is employed to maintain the gases stored in the exhaust gas container under a suitable high pressure for driving a prime mover, such as a turbine without permitting the exhaust gases to react adversely against the incoming fresh charge in the cylinder and without decreasing the output of the engine or altering its functioning in accordance with explosive exhaust followed by implosive inlet.

A power plant installation constructed in accordance with the invention also includes a prime mover, such as a turbine, in which the energy acquired by the explosively exhausted gases may be utilized. The turbine is connected to the exhaust orifice of the engine cylinder by an exhaust gas conduit and an exhaust gas container in which the exhaust gases are stored under pressure. The exhaust gas conduit is so designed that the cross-sectional area thereof adjacent its end connected to the exhaust orifice is approximately equal to the critical area of the exhaust orifice, that is, the area of the exhaust orifice opened, when the burned gases cease reacting upon the cylinder walls and start leaving the cylinder as a mass, and the combined volume of the conduit and container is greater than the volume of inert gases which the explosively exhausted mass of burned bases is capable of displacing by its ballistic push when the mass of burned gases possesses its greatest amount of dynamic energy or when a predetermined maximum charge is burned in the engine cylinder. The combined volume of the exhaust conduit and the exhaust gas container is thus sufficient to insure the formation of a gaseous pressure front within the inert gases contained in that volume and to prevent reflection or rebound of the exhaust gases and the inert gases accelerated thereby from a wall of the container.

The invention also comprehends a power plant installation, as above described, in which the exhaust gases stored under pressure are utilized for operating a turbo-blower, the output side of which is connected to the inlet orifice of the engine cylinder, as, for example, through an air receiver and an air conduit constructed in accordance with the disclosure of my U. S. Patent No. 2,281,585. By thus connecting the inlet orifice of the engine cylinder to a source of inlet gases under a pressure higher than atmospheric, a greater mass of fresh gases may be projected into the cylinder during each implosive inlet process. This, in turn, results in higher engine output and greater dynamic energy in the exhaust gases. The increased dynamic energy of the exhaust gases is capable of overcoming and building a higher gas pressure in the exhaust gas container which, in turn, results in higher output from the turbine. Thus, the output of the entire power plant installation is increased without disturbing its operation, when the inlet air or gaseous combustible mixture is supplied by implosion under pressure greater than atmospheric and when the gaseous pressure in the exhaust conduit and the connected enclosed space is also increased.

For a better understanding of the invention, reference may be had to the accompanying drawings, which are for purposes of illustration only and are not intended to define the limits of the invention. In the drawings.

Figures 1, 2:
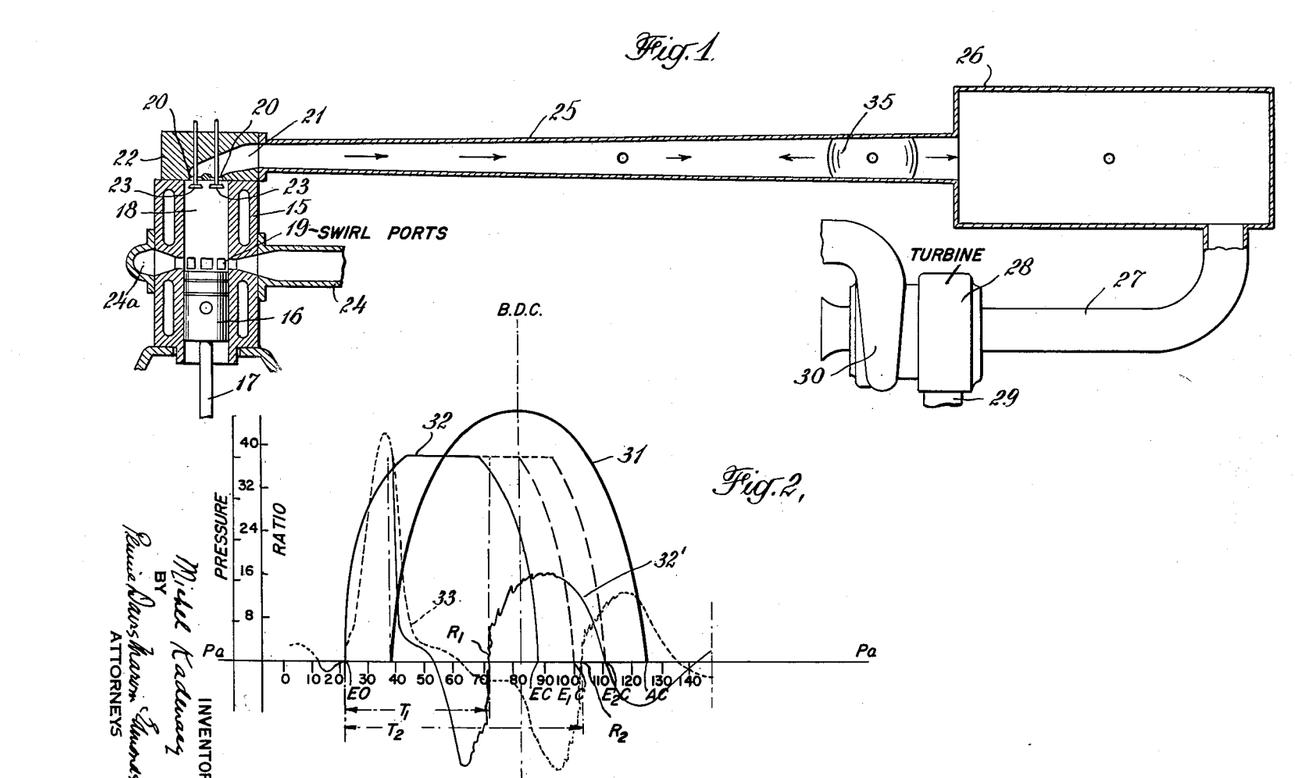
Fig. 1 is a diagrammatic side elevation view, partly in section and with parts broken away, showing one form of power plant, which embodies and is adapted to operate in accordance with the method of the present invention.
Fig. 2 is a graph illustrating the operation of a typical power plane installation of the type shown in Fig. 1.

Referring first to the embodiment of the invention illustrated in Fig. 1, there is shown one cylinder 15 of a two stroke cycle internal combustion engine in which a piston 16 is mounted for reciprocation. The piston, shown in approximately its lowermost position, may be connected in the usual manner to a crankshaft by a piston rod 17. Cylinder 15 and piston 16 together form an expansible combustion chamber 18, in which a combustible charge may be burned during each cycle of operation of the piston. In the engine shown, a series of inlet ports 19 are provided in the wall of cylinder 15, and they are opened and closed by piston 16, when the latter is near the lower end of its stroke. Ports 19 may be shaped and arranged in a well known manner to impart a swirling motion to the incoming gases to thereby create turbulence inside the cylinder. After each burning of a charge and each down stroke of piston 16, the burned or exhaust gases escape through one or more ports 20 and a passage 21 in cylinder head 22. Ports 20 are controlled by suitable valves, such as poppet valves 23, which may be actuated by any suitable known means driven in timed relation to the engine crankshaft and, hence, in timed relation to the operation of piston 16.

Fresh air or a suitable combustible mixture may be supplied to combustion space 18 through an inlet pipe 24 which communicates with ports 19 through an annular passage 24a surrounding cylinder 15. If air is introduced through ports 19, a charge of a suitable combustible, such as gasoline or oil, may be injected into space 18 by means of any well known injection device (not shown). The combustible mixture in space 18 may be ignited by a spark plug (not shown) or any other suitable known means or by the heat of compression each time piston 16 is near the top of its stroke.

An exhaust gas conduit 25 is connected to exhaust gas passage 21 at one end and to an exhaust gas container 26 at the other end thereof. Although the gases stored in conduit 25 and receiver 26 may be used in a variety of ways, the receiver is shown as connected by a conduit 27 to the input side of a turbine 28, which may be of any suitable type adapted to be driven by the expansion of a gaseous medium. Gases passing through and operating turbine 28 may be exhausted through a pipe 29. The turbine may be utilized for any desired purpose, such as driving the impeller of a blower or compressor 30.

In the engine described, the areas of inlet ports 19 and exhaust ports 20 and the operation of the control means therefor are such that the engine functions in accordance with the phenomena of explosive exhaust and implosive inlet. In order to insure adequate, and preferably maximum, time for most effective implosive inlet and to insure continuous operation of the engine in accordance with the above phenomena in spite of the relatively high gaseous pressure in the conduit 25 and exhaust gas container 26, the conduit and container should be constructed and proportioned as above described. For best results in any given type of engine, it may be necessary to base the final dimensions of conduit 25 upon data obtained by means of suitable instruments for measuring instantaneous pressures, while using a conduit of approximately correct dimensions. By plotting a curve of such pressures, as explained hereafter in connection with Fig. 2, it may be determined whether the conduit is of such cross-sectional size and length as to insure the necessary interval for inlet between the instant, when the burned gases start to leave the cylinder as a mass in explosive exhaust, and the instant, when the gases rebounding from the pressure front reach the exhaust orifice in their return movement.

A cycle of operation of the new power plant installation is as follows: Assuming that the piston 16 is near the top of its stroke and exhaust ports 20 are closed by valves 23; a combustible charge which has been highly compressed in chamber 18 by the upward movement of piston 16 is ignited, for example, by the heat of compression, and burns rapidly. Some of the energy liberated by the burning of the combustible mixture and imparted to the burned gases is utilized, when the gases push piston 16 downwardly, thereby expanding chamber 18. Just prior to the time that the piston on its downward movement opens inlet ports 19, exhaust ports 20 will be opened sufficiently wide and in a sufficiently short time by the actuation of valves 23 to permit the explosive projection of the burner gases from combustion space 18. This opening of the exhaust ports should be properly timed with the movement of piston 16, so that inlet ports 19 will be opened by the piston at or immediately after the instant that the burner gases cease to react against the walls of chamber 18 and are moving out of said chamber as a mass by virtue of the inertia thereof. The mass movement of the burned gases out of the cylinder or combustion space 18 establishes the necessary conditions therein for the implosion of a fresh charge of air or combustible mixture through inlet ports 19.

As the mass of burned gases moves with ballistic speed out of space 18 and through conduit 25, the mass compresses the inert gases immediately in front of it in the conduit and the compressed gases are caused to move with the mass of burned gases. When the dynamic energy of the burned gas mass has been spent in overcoming the inertia of the inert gases in the path thereof and in compressing and moving the inert gases, the combined mass of burned gases and the inert gases compressed thereby form a gaseous pressure front. The pressure front is formed within the body of inert gases contained in conduit 25 and container 26 and free of a wall from which the gases would rebound. A portion of the gases in the front is then projected back toward cylinder 15 through conduit 25.

During the movements of the exhaust gas mass, as described, inlet air imploded into combustion chamber 18 has passed through the chamber into the passage 21 and conduit 25 and meets the returning exhaust gases, so that a shock results. Before any important reversal of movement of the fresh gases can be produced by such shock at the inlet port of cylinder 15, exhaust ports 20 are closed by valves 23. The exhaust gases and a portion of the imploded fresh gases are, accordingly, trapped within conduit 25 and container 26 without being permitted to exercise any adverse effect upon the fresh charge inside of chamber 18. Upon closure of exhaust valves 23, the movement of the incoming fresh gases through the cylinder ends, but the momentum of those gases causes them to be compressed and, hence, creates a pressure within the cylinder 18 which is higher than atmospheric at the mouth of air pipe 24. Before the incoming gases can rebound out of the cylinder and thereby reverse the direction of movement of the air through inlet ports 19, those ports are closed by the upward movement of piston 16. Thereafter, the piston moves to the upper end of the cylinder to compress the new charge and the cycle of operation is repeated. In a multi-cylinder engine, the same cycle of operation takes place in each cylinder in timed relation to the cycle in each of the other cylinders.

The energy of the gases stored or trapped under pressure in conduit 25 and the enclosed space between the conduit and turbine 28 is utilized for doing useful work without any reaction by the gases against the internal walls or contents of the engine cylinder during the inlet period.

In the graph of Fig. 2, which illustrates the timing of the opening and closing of the exhaust and inlet ports in relation to the movements of the burned gases explosively exhausted from a cylinder of an engine in a power plant of the construction shown in Fig. 1, the abscissae represent degrees of rotation of the engine crankshaft and, hence, for a given engine speed, represent time. The ordinates of curves 31 and 32 represent the areas of the inlet and exhaust ports, respectively, opened by piston 16 and exhaust valves 23, the opened areas being expressed in terms of the ratios between the opened areas and the transverse cross-sectional area of the combustion chamber 18. The ordinates for curves 32' and 33 represent the apparent gaseous pressure measured by means of a pressure measuring instrument at a point in conduit 25 near the exhaust ports 20 during the explosive exhaust and implosive inlet processes. The base line designated Pa represents atmospheric pressure.

Curve 32 is a time-area diagram illustrating the opening and closing of exhaust ports 20 and curve 31 is a similar diagram illustrating the opening and closing of inlet ports 19. The points designated EO and AO represent the instants that the exhaust and inlet ports, respectively, begin to open. The points EC, $E_1C$, and $E_2C$ represent different times at which the exhaust ports may be fully closed, and AC represents the time of complete closing of the inlet ports. The curves 32' and 33 are typical for two different installations, the first curve representing an installation, which does not operate satisfactorily, and the second representing an installation, which does operate satisfactorily.

As indicated by curves 32' and 33, there is a shock and a sharp pressure impulse at the assumed point of measurement in conduit 25 upon the opening of the exhaust port. When the exhaust gas mass has passed that point, the apparent pressure at that point drops off suddenly and levels off slightly as the imploded inlet gases arrive at the point. Thereafter, the apparent pressure drops still further and then sharply rises again as the shock of the rebounding exhaust gases arrives at the point in its movement toward the engine cylinder. The moment when the shock reaches the point of measurement is approximately represented by the point $R_1$ for conditions represented by curve 32'. In an installation operating in accordance with curve 32', the time interval for implosive inlet is represented by the relatively short vector $T_1$ and the rebounding exhaust gases will push the inlet charge into and out of the cylinder through the fully opened exhaust and inlet ports before the exhaust port can be closed. Hence, the fresh incoming charge will be diluted and reduced or completely expelled from the cylinder by the rebounding exhaust gases.

In an installation which produces the time pressure curve 33, the approximate instant at which the shock of the rebounding exhaust gas mass arrives at the cylinder is indicated by the point $R_2$, thereby affording the time interval represented by the vector $T_2$ for undisturbed implosive inlet of fresh gases. Additionally, if the exhaust port is closed at either the point EC or $E_1C$, the returning exhaust gas mass is prevented by such closure from acting adversely upon the contents of the cylinder. The exhaust gas movement, and hence the contours of curves 32' and 33, indicate that that movement may be controlled by the use of an exhaust gas conduit 25 constructed, as disclosed in the foregoing, to give a long time interval for implosive inlet, and an exhaust gas container of the type above described as suitable for the purpose. In some instances, the time of closing of the exhaust ports may be adjusted in accordance with the movement of the exhaust gas mass and, hence, prevent the latter from disturbing the fresh charge inside the cylinder, even though the pressure in the exhaust system may be high.

For different loadings of the engine, the residual energy in the burned gases after actuation of piston 16 will vary and, hence, the dynamic energy of the explosively exhausted gas mass will vary. As a result, the pressure front is created at different positions in the combined volumes of conduit 25 and exhaust gas container 26, but the time required for the exhaust gas movements does not vary appreciably in a given installation. For example, when the engine is operating at half load, the gaseous pressure front may be formed at a position only part-way along the exhaust conduit toward the container. At full load operation, the dynamic energy of the exhaust gas mass may be spent when the pressure front is formed at approximately the position 35. Under maximum load, when the intensity of the dynamic energy of the exhaust gas mass is a maximum, the pressure front may be formed inside exhaust gas container 26. In all cases, the construction should be such that the pressure front will be formed within the body of gases contained in the combined volumes of conduit 25 and container 26.

Since the receiver is of greater cross-sectional area than the conduit, it will be evident that the inert gases therein offer greater resistance than those contained in the conduit to the travel of exhaust gas masses and, when an exhaust gas mass enters the receiver, the pressure front is quickly formed. As the pressure front develops when all the dynamic energy in an exhaust gas mass has been utilized to compress and displace inert gases, and since it is desirable to displace inert gases from the conduit into the receiver, a conduit of ideal length will contain approximately the maximum quantity or a little less of inert gases, which can be displaced by an exhaust gas mass of maximum energy. The pressure front will then be formed at the junction of the conduit to the receiver or within the receiver just beyond the end of the conduit. If the pressure front is formed within the receiver just beyond the end of the conduit, it will be apparent that not all the gases rebounding from the pressure front will return through the conduit. If the conduit is of less length than the maximum stated, each exhaust gas mass will enter the receiver and the pressure front will be quickly formed with consequent reduction in the time interval for inlet. If the conduit is longer than the maximum stated, so that the pressure front develops in the conduit, the return travel of the gases rebounding from the pressure front will be more rapid and more violent than from a pressure front developed within the receiver. Accordingly, best results are obtained if the conduit is of such length as to contain a little less than the maximum quantity of inert gases displaceable by an exhaust gas mass of maximum energy, since this will insure that each exhaust gas mass will have approximately the maximum outward travel and not all of the gases rebounding from the pressure front will return through the conduit, so that their return movement will be of less than maximum violence.

Figure 3:
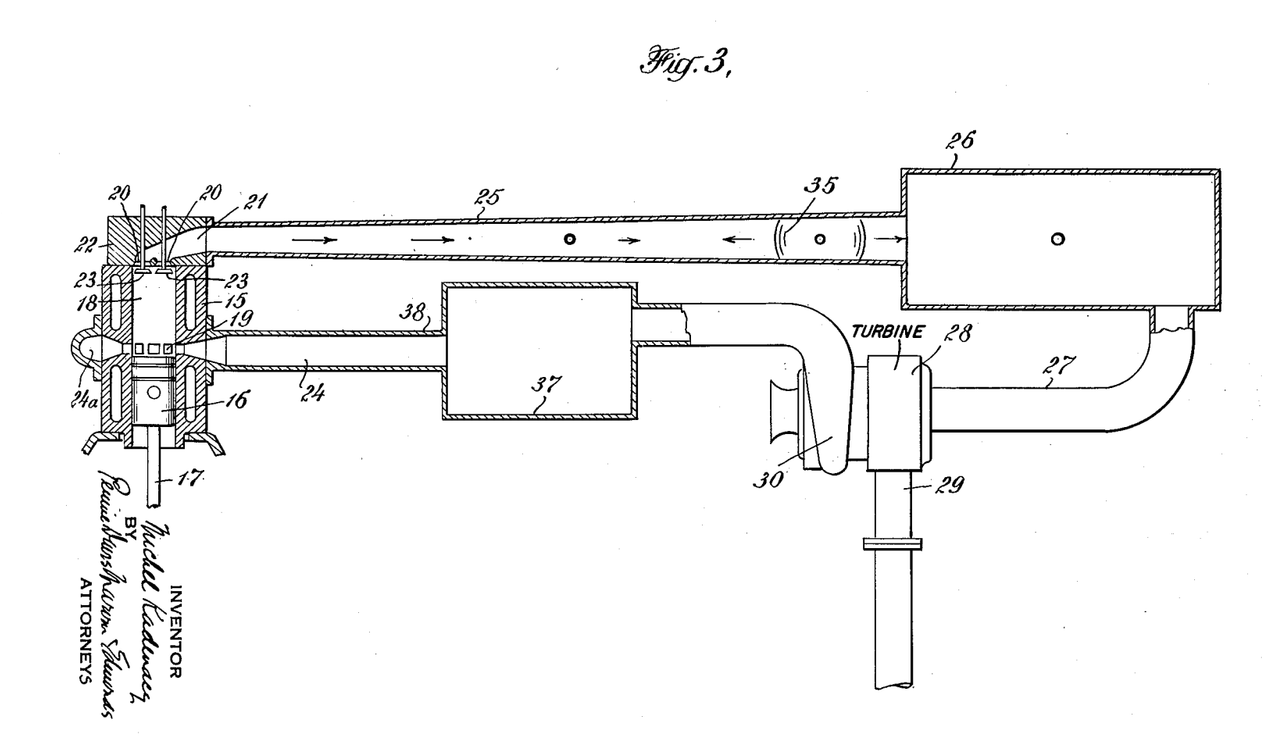
Fig. 3 is a view similar to Fig. 1 showing a new power generating plant of modified construction.

The construction illustrated in Fig. 3 is the same in some respects as that shown in Fig. 1, and corresponding parts are indicated by the same reference characters. Blower 30 is connected to discharge into a receiver 37, which is in turn connected to the inlet ports 19 of cylinder 15 by means of an air conduit 38. Conduit 38 and receiver 37 are, preferably, constructed and installed in accordance with the teachings of my Patent No. 2,281,585. The operation of the Fig. 3 apparatus is the same as that of the Fig. 1 installation, but the gaseous pressures throughout the entire installation are increased by the increase in the pressure of the inlet gas, such increase being the difference between atmospheric pressure prevailing at the mouth of air pipe 24 (Fig. 1) and the mean gas pressure in air receiver 37. As compared with the Fig. 1 apparatus, the mass of each fresh charge in a cylinder of the Fig. 3 apparatus will be greater and the energy developed by the burning of the charge will be greater, so that the output of the engine is increased and a greater amount of dynamic energy acquired by the exhaust gases. Because of such increase in the energy acquired by the exhaust gases, the resistance of a greater mass of inert gases under higher pressure in conduit 25 may be overcome by the exhaust gas mass and, hence, a higher pressure may be maintained in conduit 25 and container 26 without disturbing the proper functioning of the engine. A greater output may also be obtained from turbine 28. The overall output of the entire installation is, accordingly, increased by supplying fresh air to the engine cylinders under pressure greater than atmospheric. If desired, blower 30 may be connected directly to the inlet ports of the cylinder without the interposition of air receiver 37, although the supercharging of the cylinder will then be less.

Figure 4:
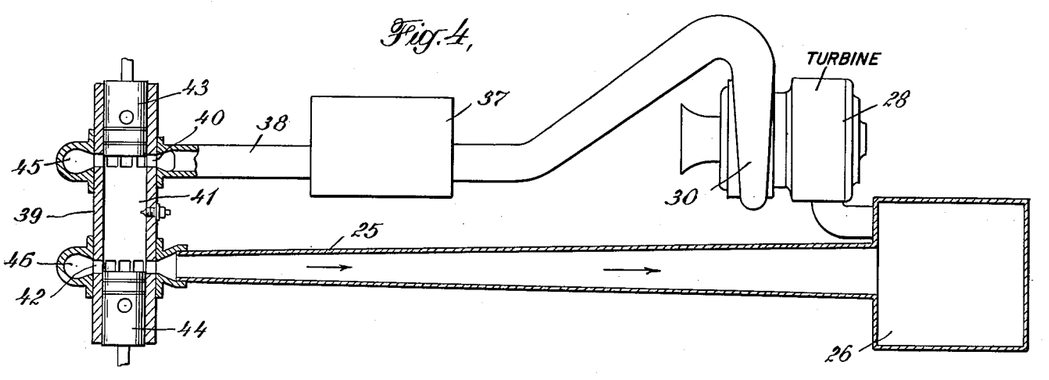
Fig. 4 is a view similar to Fig. 3 showing an embodiment of the invention, in which the internal combustion engine is of the opposed piston type.

The new plant in the form illustrated in Fig. 4 is the same in most respects as that shown in Fig. 3 and similar parts are indicated by the same reference characters. In the Fig. 4 apparatus, an opposed piston type of two cycle engine is employed. The cylinders 39 of this engine have a series of inlet ports 40 adjacent one end of the combustion chamber 41 and a series of exhaust ports 42 adjacent the opposite end of the chamber, the ports being controlled by the opposed pistons 43 and 44, respectively. Ports 40 and 42 are connected with conduits 38 and 25 through annular chambers 45 and 46, respectively. In engines of this type, the closing of the exhaust ports before the closing of the inlet ports is made possible by dephasing the two pistons in a manner well understood in the art.

Figures 6, 7, 8:
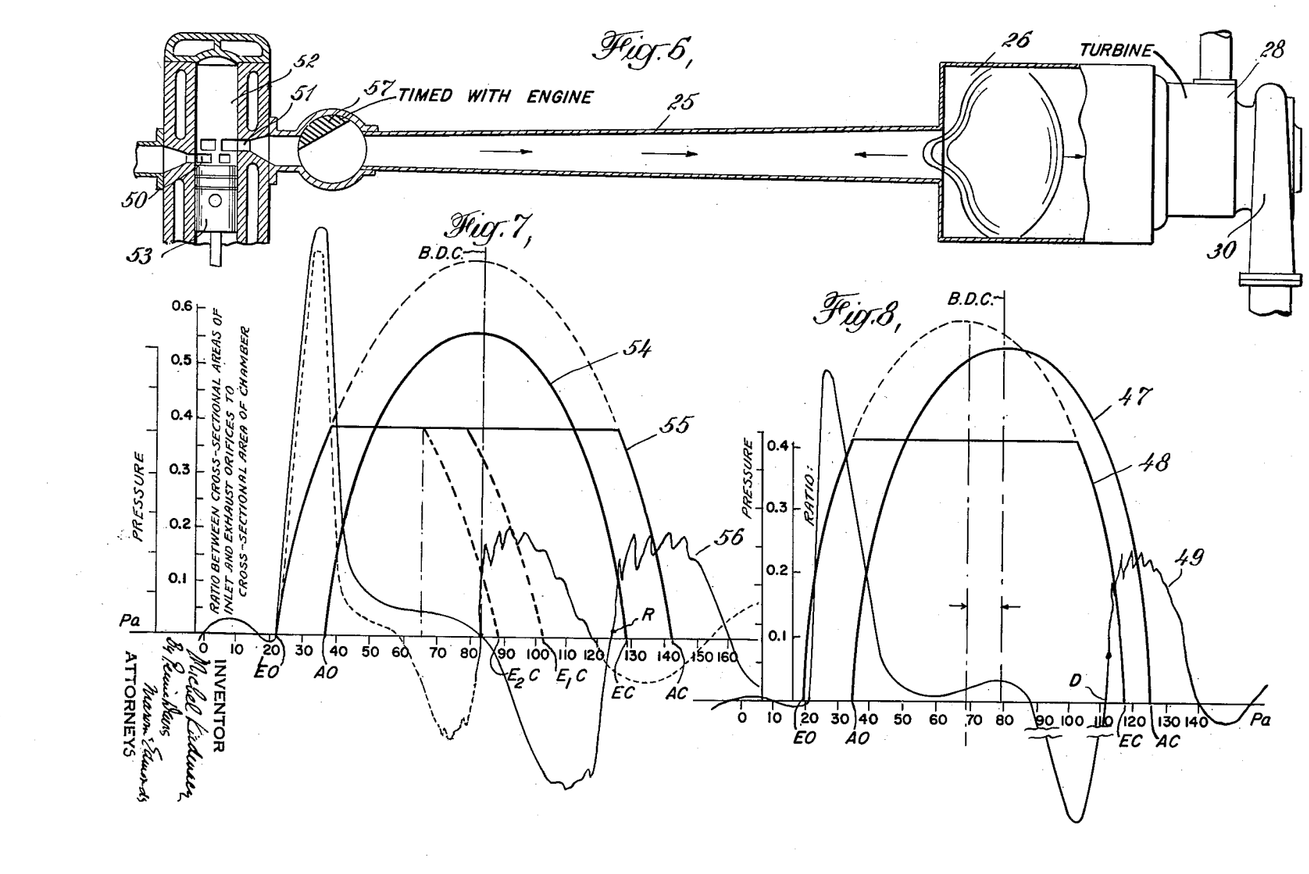
Figs. 7 and 8 are graphs illustrating the operation of typical power plant installations of the character shown in Figs. 4 and 5, respectively.
Figure 9:
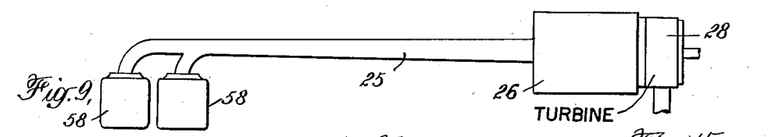
Figs. 9 to 12, inclusive, are diagrammatic illustrations showing different ways in which the invention may be adapted to multi-cylinder engines of different types.
Figure 10:
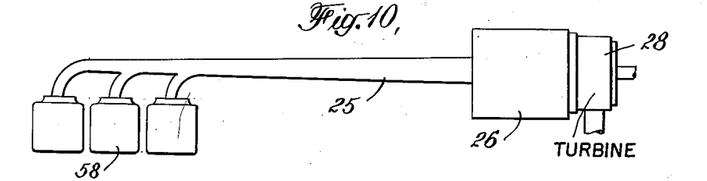
Figure 11:
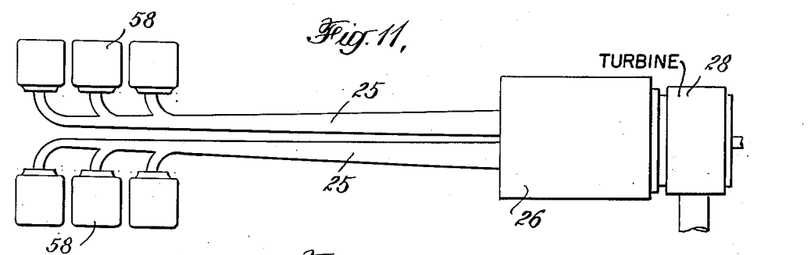
Figure 12:
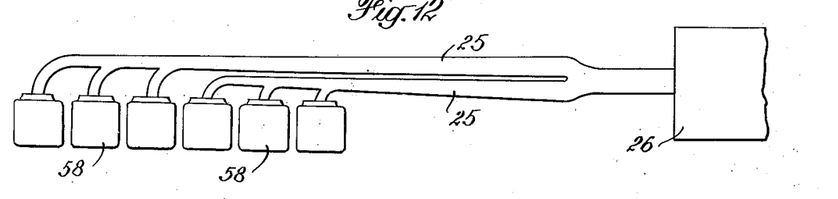

Typical curves comparable to those illustrated in Fig. 2 are shown in Fig. 8 and graphically represent the operation of the type of power plant shown in Fig. 4. Curves 47 and 48 are time-area diagrams of the inlet and exhaust port openings, respectively, and curve 49 is a time-pressure diagram from which the movements of the explosively exhausted burned gas mass may be ascertained. The front of shock produced by the rebounding exhaust gas mass reaches a point near cylinder 39, i. e., the point at which the pressure measurements for curve 49 are taken, at approximately the moment represented on the curve by the letter D. The moment of the return of the exhaust gas mass to the point of measurement, which follows the arrival of the front of shock at that point, must occur after the closure of the exhaust port in order to prevent the action of the exhaust gases from hampering the implosive inlet process. The exhaust gas conduit should, accordingly, be correctly constructed as to form and size, in accordance with the principles above set forth, so that the return of the exhaust gases to the cylinder will occur at the latest possible moment. The operation of the device for closing the exhaust ports, which, in this case, is piston 44, should then be adjusted to close the ports at such time as to trap the exhaust and inert gases inside the exhaust gas conduit and the exhaust gas container.

Figure 5:
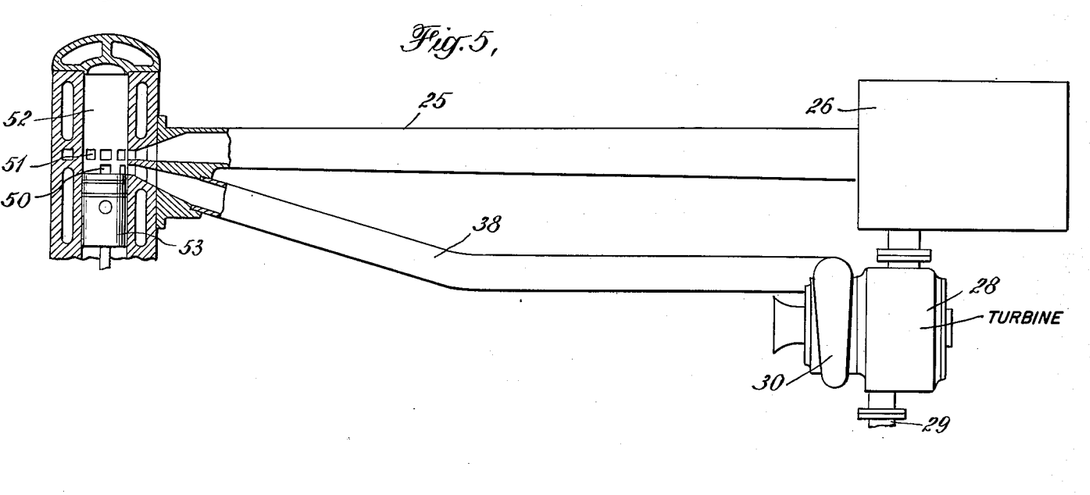
Figs. 5 and 6 are views similar to Fig. 1 illustrating other modifications of the invention embodying an engine of the loop scavenging type.

Another embodiment of the invention is illustrated in Fig. 5 as including an engine wherein the inlet ports 50 and the exhaust ports 51 of the cylinders are both arranged near the lower end of the combustion space 52. In such an engine, both the inlet and exhaust ports are controlled by the reciprocating piston 53 and it is impossible to close the exhaust ports prior to closure of the inlet ports. Typical time-area diagrams 54 and 55 for the inlet and exhaust port openings in this type of installation are shown in Fig. 7. Since the inlet ports must be closed before the exhaust ports, it is not possible to obtain the supercharging effect produced by the implosive inlet in the embodiments heretofore described, in which the momentum of the inlet gases is used for supercharging during the period when the inlet ports are open but the exhaust ports are closed. It is possible, however, to produce a supercharge effect in the engine of Fig. 5 by utilizing the momentum of the rebounding exhaust gases and the shock produced when the returning exhaust gas mass meets the incoming fresh gases which have entered exhaust gas conduit 25 as a result of the implosive inlet process. By properly constructing the exhaust gas conduit, this shock may be caused to occur at approximately the moment that the inlet orifices 50 are closed or substantially closed, this moment being represented by the point R on curve 56 (Fig. 7). When the installation is operated in this manner, the rebounding exhause gases push the fresh gases, which have entered conduit 25, back into the combustion space 52 and thereby compress the charge within said space before the closing of the exhaust ports.

It may be desirable, in an installation which includes an engine of the type illustrated in Fig. 5, to introduce a supplementary device for cutting off communication between the exhaust gas conduit 25 and combustion space 52 before the piston closes either the inlet or exhaust ports. Such a structure is illustrated in Fig. 6, wherein the supplementary control device takes the form of a rotary valve 57. This valve may be operated in timed relation with piston 53 so that the valve will be in open position at the moment that the exhaust ports 51 are opened by the piston. Valve 57 should be timed to close before the piston closes inlet ports 50 and before the rebounding exhaust gases reach the valve. When the valve 57 or other equivalent device is employed, the time-area curve indicating the closing and opening of the exhaust passages may, for example, be modified in the manner illustrated by the curves $O_1$, $E_1C$, or $O_2$, $E_2C$ of Fig. 7, or in any other suitable way.

Figure 13:
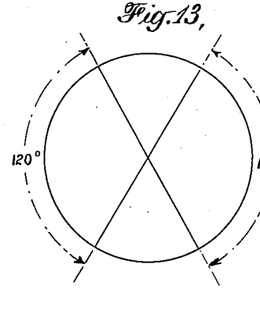
Figs. 13 to 15 are schematic diagrams for illustrating the operation of the exhaust or inlet control devices in multi-cylinder engines.
Figure 14:
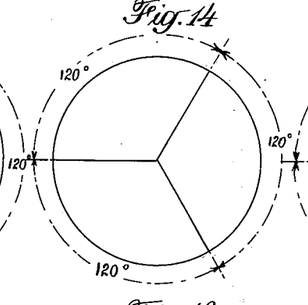
Figure 15:
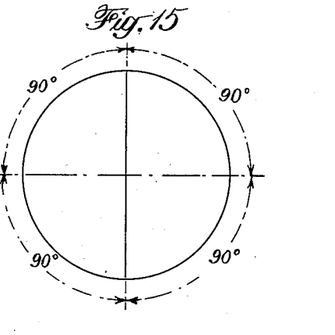

As disclosed in my Patent No. 2,130,721, a plurality of cylinders of a multi-cylinder two cycle engine in installations as above described may be connected to a common exhaust gas receiver through a common exhaust gas conduit or through separate conduits. When a common exhaust gas conduit is connected to more than one cylinder, however, the exhaust ports of only one of the cylinders should be open at any time. Figs. 9 to 12, inclusive, illustrate how different groups of cylinders 58 in different types of engines may be connected to common exhaust gas conduits. As a practical matter, the exhaust ports for each cylinder of a low speed two cycle engine remain open for approximately 90 degrees or less of each revolution of the engine crankshaft, as is illustrated in Fig. 15. In high speed two cycle engines, the exhaust ports in each cylinder may remain open during approximately 120 degrees of revolution of the crankshaft, as illustrated in Figs. 13 and 14. In practice, therefore, it is usually possible to connected as many as four cylinders of a low speed engine to a common exhaust gas conduit, whereas, in a high speed engine, not more than three cylinders may be similarly connected.

It will be obvious that a common inlet air receiver may also be used for supplying fresh gaseous charges to a plurality of the cylinders of a multi-cylinder engine through one or a plurality of inlet gas conduits. It will also be clear that a single exhaust gas receive or container may be utilized for servicing a plurality of turbines or other devices which are capable of operation by the gaseous medium trapped in the receiver.

If desired, the exhaust gas conduit coming from one or a group of engine cylinders may extend into the interior of the exhaust gas receiver 26. This serves to increase the length of the conduit without increasing the overall length of the installation.

In order to minimize the resistance to the ballistic movement of the explosively exhausted burned gas mass through the exhaust gas conduit and, hence, minimize the dissipation of the dynamic energy of that mass in overcoming resistance other than the inertia of the inert gas mass within the conduit, the latter preferably has a smooth and polished internal surface. For the same reasons, the transverse cross-sectional area of conduit 25 may be gradually increased, either uniformly or step by step, in the direction of movement of the exhaust gas mass away from the cylinder. As an example, the conduit may have a conicity of from 1% to 10%, as explained in my co-pending application.

The energy of the exhaust gases stored under pressure in exhaust gas receiver 26 may be utilized in operating an engine of any suitable type or in performing other useful work. This energy may, for example, be utilized to drive a turbine wheel, to drive a low pressure hot gas piston engine, to heat a boiler, or otherwise. In all cases, it is advantageous to maintian the stored gases under relatively high pressure, the upper limit of which is determined by the amount of dynamic energy possessed by the explosively exhausted burned gases.

Although only a few embodiments of the invention have been diagrammatically illustrated and described, it is to be expressly understood that the scope of the invention is not limited thereto.

This application is related to my co-pending application Ser. No. 588,189 filed April 13, 1945.

I claim:

1. In a power plant comprising a two cycle internal combustion engine having a cylinder, in which charges of combustible mixture are successively burned and which is provided with inlet and exhaust orifices, the exhaust orifice being of such size in relation to the cross-section of the cylinder as to make possible explosive exhaust, the combination of means, including a reciprocating piston within the cylinder, for controlling the orifices and acting successively in the following order, (1) to open the exhaust orifice, when the piston has reached approximately the end of its downward stroke, in such manner as to produce explosive exhaust of the burned gases as a mass from the cylinder, (2) to open the inlet orifice, after explosive exhaust has started, to admit a fresh charge into the cylinder, and (3) to close the orifices to prevent the re-entry into the cylinder of burned gases, which have left the cylinder, and to confine the fresh charge within the cylinder, means for holding under pressure the gases discharged from the cylinder, said means including a conduit having one end leading from the exhaust orifice and a receiver connected directly to the other end of the conduit and of greater volume and cross-sectional area than the conduit, the conduit having a cross-sectional area at its connection to the exhaust orifice substantially the same as the critical area of the exhaust orifice for explosive exhaust and the conduit affording a free passage for said burned gases explosively exhausted as a mass, the conduit having such a length that it contains approximately the maximum volume of inert gases displaceable by such an exhaust gas mass of maximum energy, whereby each of said exhaust gas masses traveling through the conduit causes a static pressure front to develop in the holding means at such a distance from the exhaust orifice as to permit the orifice control means to close the exhaust orifice before gases returning from the pressure front through the conduit can enter the cylinder through the orifice, an outlet from the receiver lying farther from the exhaust orifice than the place where said pressure front develops, and a turbine having its inlet connected to the receiver outlet and driven by gases from the receiver.

2. In a power plant comprising a two cycle internal combustion engine having a cylinder, in which charges of combustible mixture are successively burned and which is provided with inlet and exhaust orifices, the inlet and exhaust orifices being of such size in relation to the cross-section of the cylinder as to make possible implosive inlet and explosive exhaust, respectively, the combination of means, including a reciprocating piston within the cylinder, for controlling the orifices and acting successively in the following order, (1) to open the exhaust orifice, when the piston has reached approximately the end of its downward stroke, in such manner as to produce explosive exhaust of the burned gases as a mass from the cylinder, (2) to open the inlet orifice, after explosive exhaust has started, in such manner as to produce implosive inlet of a fresh charge into the cylinder, and (3) to close the orifices to prevent the re-entry into the cylinder of burned gases, which have left the cylinder, and to confine the fresh charge within the cylinder, means for holding under pressure the gases discharged from the cylinder, said means including a conduit having one end leading from the exhaust orifice and a receiver connected directly to the other end of the conduit and of greater volume and cross-sectional area than the conduit, the conduit having a cross-sectional area at its connection to the exhaust orifice substantially the same as the critical area of the exhaust orifice for explosive exhaust and the conduit affording a free passage for said burned gases explosively exhausted as a mass, the conduit having such a length that it contains approximately hte maximum volume of inert gases displaceable by such an exhaust gas mass of maximum energy, whereby each of said exhaust gas masses traveling through the conduit causes a static pressure front to develop in the holding means at such a distance from the exhaust orifice as to permit the orifice control means to close the exhaust orifice before gases returning from the pressure front through the conduit can enter the cylinder through the orifice, an outlet from the receiver lying farther from the exhaust orifice than the place where said pressure front develops, and a turbine having tis inlet connected to the receiver outlet and driven by gases from the receiver.

MICHEL KADENACY.

REFERENCES CITED

The following references are of record in the file of this patent:

UNITED STATES PATENTS

| Number | Name | Date |
|---|---|---|
| 1,593,571 | Curtis | July 27, 1926 |
| 1,895,538 | Büchi | Jan. 31, 1933 |
| 2,102,559 | Kadenacy | Dec. 14, 1937 |
| 2,113,480 | Kadenacy | Apr. 5, 1938 |
| 2,130,781 | Kadenacy | Sept. 20, 1938 |
| 2,131,959 | Kadenacy | Oct. 4, 1938 |
| 2,281,585 | Kadenacy | May 5, 1942 |

FOREIGN PATENTS

| Number | Country | Date |
|---|---|---|
| 308,595 | Great Britain | Aug. 18, 1930 |
| 456,989 | Great Britain | Sept. 16, 1936 |
| 684,902 | France | Mar. 24, 1930 |